US 11,657,415 B2

(12) United States Patent
Rawat et al.

(10) Patent No.: US 11,657,415 B2
(45) Date of Patent: May 23, 2023

(54) NET PROMOTER SCORE UPLIFT FOR SPECIFIC VERBATIM TOPIC DERIVED FROM USER FEEDBACK

(71) Applicant: MICROSOFT TECHNOLOGY LICENSING, LLC, Redmond, WA (US)

(72) Inventors: Manoj Kumar Rawat, Bellevue, WA (US); Gregory Lawrence Brake, Sammamish, WA (US); Christopher Lawrence Laterza, Issaquah, WA (US); Erfan Najmi, Renton, WA (US); Andres Felipe Salcedo, Seattle, WA (US); Jin Luo, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/315,393

(22) Filed: May 10, 2021

(65) Prior Publication Data
US 2022/0358529 A1 Nov. 10, 2022

(51) Int. Cl.
*G06Q 30/02* (2023.01)
*G06Q 30/0203* (2023.01)
(Continued)

(52) U.S. Cl.
CPC ....... *G06Q 30/0203* (2013.01); *G06F 16/353* (2019.01); *G06F 40/30* (2020.01);
(Continued)

(58) Field of Classification Search
None
See application file for complete search history.

(56) References Cited

U.S. PATENT DOCUMENTS 8,271,103 B2 9/2012 Hendler et al.
9,723,145 B2 8/2017 Bell et al.
(Continued)

FOREIGN PATENT DOCUMENTS

CN 112257733 A 1/2021
WO 2015009620 A1 1/2015
WO WO-2019182789 A1 * 9/2019 ............... G06F 8/77

OTHER PUBLICATIONS

Selena "Net Promotor Score and Loyalty", Aug. 2018, (https://fotoinc.com/author/selena-horner/), pp. 1-7 (Year: 2018).*
(Continued)

*Primary Examiner* — Romain Jeanty
(74) *Attorney, Agent, or Firm* — NovoTechIP International PLLC

(57) ABSTRACT

A system and method for online user feedback management are provided. The method includes receiving online user feedbacks for a product from a plurality of users. A plurality of topics for the product are identified from the online user feedbacks. For each topic, the received online user feedbacks are categorized into a plurality of groups based on a rating score provided in each online user feedback for the product and semantic analysis of each online user feedback for the product. A net promoter score (NPS) uplift for each topic is calculated, where the NPS uplift measures an improvement in a NPS for the product if issues related to the topic are resolved. A priority topic is identified based on the NPS uplift for each of the topics. The priority topic is then prioritized in resolving issues related to the topics included in the online user feedbacks.

19 Claims, 9 Drawing Sheets

(51) Int. Cl.
  *G06F 16/35*   (2019.01)
  *G06N 20/00*   (2019.01)
  *G06F 40/30*   (2020.01)
  *G06Q 30/0201*   (2023.01)
  *G06Q 30/0601*   (2023.01)

(52) U.S. Cl.
  CPC ......... *G06N 20/00* (2019.01); *G06Q 30/0201* (2013.01); *G06Q 30/0631* (2013.01)

(56) References Cited

U.S. PATENT DOCUMENTS

| | | |
|---|---|---|
| 10,346,881 B2 | 7/2019 | French et al. |
| 2008/0162399 A1 | 7/2008 | Tam et al. |
| 2012/0110021 A1 | 5/2012 | Hryniewicki |
| 2013/0185291 A1* | 7/2013 | Tyndall ............... G06F 16/9535 707/723 |
| 2014/0114648 A1* | 4/2014 | Eggink ................. G06F 40/30 704/9 |
| 2015/0120390 A1 | 4/2015 | Pace |
| 2015/0134404 A1 | 5/2015 | Gustafson et al. |
| 2016/0034930 A1 | 2/2016 | Verschoor et al. |
| 2017/0372231 A1* | 12/2017 | Ghatage ................. G06F 40/58 |
| 2018/0018577 A1 | 1/2018 | Fink et al. |
| 2018/0285745 A1 | 10/2018 | Lu et al. |
| 2019/0026964 A1* | 1/2019 | Papa ..................... G06K 9/6271 |
| 2019/0156241 A1 | 5/2019 | Hughes |
| 2019/0244225 A1* | 8/2019 | Ravichandran ......... G10L 15/22 |
| 2020/0004816 A1 | 1/2020 | Kieser et al. |
| 2020/0042946 A1 | 2/2020 | Li et al. |
| 2020/0082415 A1 | 3/2020 | Laterza |
| 2020/0250562 A1* | 8/2020 | Bly ......................... G06N 5/022 |
| 2021/0065258 A1 | 3/2021 | Mohammad et al. |
| 2022/0366138 A1 | 11/2022 | Thirumal et al. |
| 2022/0366139 A1 | 11/2022 | Thirumal et al. |

OTHER PUBLICATIONS

Devin "What Is a Net Promoter Score An NPS Guide for 2020", Oct. 2018 Survey Category, pp. 1-9 (Year: 2018).*

"6 Strategies to Improve Your NPS®", Retrieved from: https://web.archive.org/web/20200511080730/https:/www.hotjar.com/net-promoter-score/improve-nps/, May 11, 2020, 6 Pages.

"How to Update, Revise, and Review Your NPS Comments", Retrieved from: https://web.archive.org/web/20200815065705/https:/goascribe.com/reading-nps-comments/, Aug. 15, 2020, 6 Pages.

Diwan, Tanuj, "Increase Net Promoter Score with these 11 Surefire Strategies", Retrieved from: https://www.surveysensum.com/customer-experience/net-promoter-score/improve-net-promoter-score/, Nov. 19, 2019, 23 Pages.

Frampton, Sam, "How to Improve Your Net Promoter Score?", Retrieved from: https://chattermill.com/blog/How-to-improve-net-promoter-score/, Aug. 16, 2018, 18 Pages.

"Automate Data Labeling", Retrieved from: https://web.archive.org/web/20200601113516/https:/docs.aws.amazon.com/sagemaker/latest/dg/sms-automated-labeling.html, Jun. 1, 2020, 5 Pages.

Lee, et al., "Lean-Life: A Label-Efficient Annotation Framework Towards Learning from Explanation", In Repository of arXiv:2004.07499v1, Apr. 16, 2020, 8 Pages.

Tchoua, et al., "Creating Training Data for Scientific Named Entity Recognition with Minimal Human Effort", In Proceedings of International Conference on Computational Science, Jun. 12, 2019, pp. 1-14.

U.S. Appl. No. 17/356,122, filed Jun. 23, 2021.
U.S. Appl. No. 17/322,720, filed May 17, 2021.
"International Search Report and Written Opinion Issued in PCT Application No. PCT/US22/024136", dated Jul. 12, 2022, 14 Pages.
"International Search Report and Written Opinion Issued in PCT Application No. PCT/US22/026085", dated Jul. 13, 2022, 12 Pages.

* cited by examiner

500

Automatically categorize each of the received online user feedbacks into one of a plurality of groups based on a rating score for each online user feedback and semantic analysis for the online user feedbacks 501

Identify a subset of the online user feedbacks that can be moved among the plurality of groups based on an assumption that one or more issues related to the topic are resolved 503

Determine a net promoter score uplift for each topic based on a movement of the subset of online user feedbacks 505

FIG. 5

NET PROMOTER SCORE UPLIFT FOR SPECIFIC VERBATIM TOPIC DERIVED FROM USER FEEDBACK

BACKGROUND

An online user feedback platform is a tool that allows users or customers to provide online user feedback towards a product, service, website, etc. Online user feedbacks provide valuable information from users or customers about their reactions to a product, service, or website experience, which can be used by marketers, researchers, and user experience (UX) designers to address issues related to the product, service, or website, so as to improve the relevant product, service, or website for better user experience. However, different users may have different preferences and interests, and thus the collected user feedbacks for each product, service, or website may cover a variety of different areas, for example, reliability, performance, value, missing features, ease of use, updates, etc. This then leaves a burden on the marketers, researchers, and UX designers to identify an area(s) of interest, so as to invest the limited resource to the area(s) that can greatly improve user experience. Identifying the area(s) of interest requires the marketers, researchers, and UX designers to quantify and prioritize a large number, e.g., tens of thousands or even hundreds of thousands, of user feedbacks in a short period of time, which may delay the time for a quick response to the key issues raised in the feedbacks. In addition, current online user feedback platforms are focused on the collection of user feedback without providing follow-ups to the issues raised in these feedbacks, and thus are not responsive and interactive with customers or users, which may prevent customers or users from providing feedback when there is a request.

Hence, there is a need for an efficient online user feedback platform that is more responsive and interactive and can directly provide an identified area(s) of interest, instead of a large number of original user feedbacks to the marketers, researchers, and UX designers.

SUMMARY

In one aspect, a system for managing online user feedbacks for a product includes a processor, and a memory coupled to the processor and configured to store executable instructions that, when executed by the processor, cause the processor to receive, via a communication network, the online user feedbacks for the product from a plurality of users, where the online user feedbacks are received through an online feedback management platform managing the online user feedbacks provided by the plurality of users through the communication network; perform semantic analysis of each online user feedback for the product using a machine learning algorithm; automatically identify a plurality of topics for the product from the online user feedbacks based on performing the semantic analysis; for each topic, automatically categorize each of the received online user feedbacks into one of a plurality of groups based on a rating score provided for the product in each online user feedback and the semantic analysis of each online user feedback for the product; for each topic, automatically identify a subset of the online user feedbacks to be moved among the plurality of groups based on an assumption that one or more issues related to the topic are resolved; determine a net promoter score (NPS) uplift for each topic based on a movement of the subset of online user feedbacks, wherein the NPS uplift measures an improvement in a first NPS for the product if the one or more issues related to the topic are resolved; identify, from the plurality of topics included in the user feedbacks for the product, a priority topic based on the NPS uplift for each of the plurality of topics; and prioritize the identified topic when resolving an issue related to the plurality of topics included in the online user feedbacks.

The above general aspect may include one or more of the following features: automatically categorize each of the received online user feedbacks into one of a promoter, passive, and detractor groups, and further classify the online user feedbacks categorized into each of the promoter, passive, and detractor groups into one of an on-topic, off-topic, and no-verbatim subgroups; determine the first NPS for each topic based on categorizing the received online user feedbacks into one of the promoter, passive, and detractor groups, determine a second NPS for each topic based on the movement of the subset of the online user feedbacks, and determine the NPS uplift for each topic based on the first NPS and the second NPS; the subset of online user feedbacks to be moved among the plurality of groups includes a set of online user feedbacks that are categorized into the passive and detractor groups when determining the first NPS and are also recategorized into the promoter group when determining the second NPS; analyze an online user feedback to determine whether the online user feedback includes text, and responsive to determining that the online user feedback fails to include the text, classify the online user feedback into the no-verbatim subgroup; responsive to determining that the online user feedback includes the text, for each topic, analyze the online user feedback to determine whether the text includes one or more words that are related to the topic, responsive to determining that the online user feedback includes the one or more words that are related to the topic, classify the online user feedback into the on-topic subgroup for the topic, and responsive to determining that words included in the online user feedback are unrelated to the topic, classify the online user feedback into the off-topic subgroup for the topic; recognize the one or more words included in the text using optical character recognition technology; recognize the one or more words included in the text using a machine learning model; prioritize a provision of a response to an online user feedback related to the priority topic; automatically modify a survey used to collect the online user feedbacks to include sub-topics related to the priority topic in collecting incoming online user feedbacks for the product; automatically forward an incoming online user feedback related to the priority topic to an entity; and automatically generate a response for an incoming user feedback related to the priority topic.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accordance with the present teachings, by way of example only, not by way of limitation. In the figures, like reference numerals refer to the same or similar elements. Furthermore, it should be understood that the drawings are not necessarily to scale.

FIG. 5 is a flowchart of an example method for calculating NPS uplift for a given topic.

DETAILED DESCRIPTION

Figure 1:
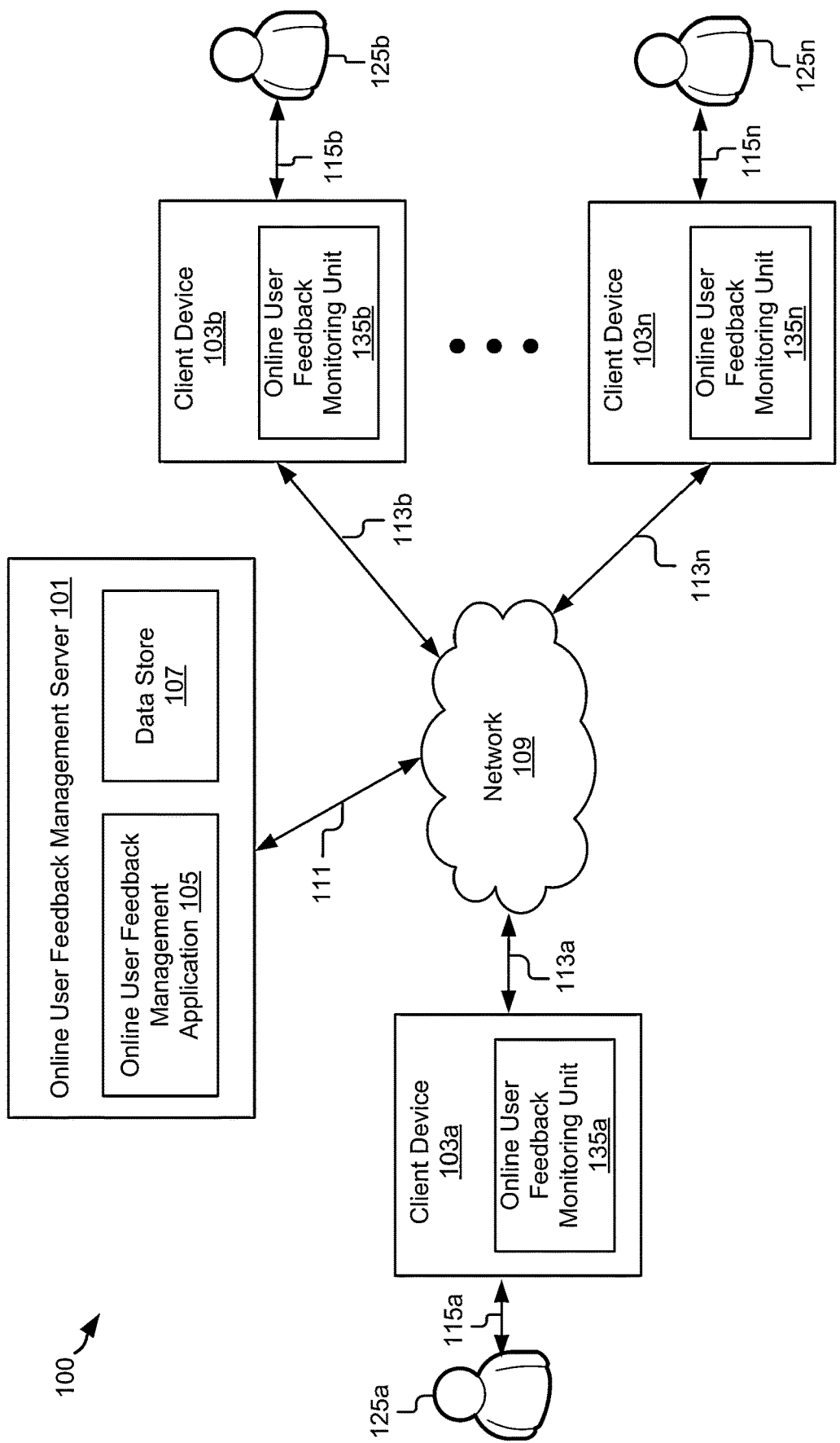
FIG. 1 is a block diagram of an example online user feedback management system.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Due to the quick growth of online marketing, online user feedback platforms (such as product review platforms for e-business companies) have become an effective tool for marketers, researchers, and UX designers to identify the issues related to the products, services, or websites. Currently, online user feedback platforms generally provide a survey for users to input their feedbacks and insights (together may be referred to as "feedbacks") for the products and services they received or the websites they browsed. For example, an online user feedback platform may provide a survey for rating a product, service, or website that customers may receive or browse. In some implementations, an online user feedback platform may further provide a comment area for customers to input text, and/or attach or paste an image, a link, and so on. Accordingly, the current online user feedback platforms are generally considered as a gateway for information (such as ratings or comments) collection by marketers, researchers, and UX designers. That is, the current online user feedback platforms merely serve as a passive gateway for information collection, but cannot be used as an active tool for marketers, researchers, and UX designers to interact with customers or users when addressing issues raised in the feedbacks, e.g., without providing instant or short-time responses to the issues raised in the feedbacks and comments. Due to a large number of user feedbacks, it is quite challenging to provide an instant response to each issue raised in the feedbacks, especially when a certain period of time is required to form a proper response strategy for each issue. In addition, due to the different preferences and interests from different users, current user online feedbacks are immersed with many different topics and thus the management of user feedback system faces problems to address so many user feedbacks without a priority.

The present disclosure provides a technical solution to address the foregoing technical problems associated with the current online user feedback platforms. To this end, the technical solution includes monitoring the content of online user feedbacks in real-time, to automatically identify topics from user feedbacks and prioritize a priority topic from the identified topics. As a result, immediate action can be properly initiated. For example, a response may be instantly generated and provided to a user feedback. In some implementations, the technical solution collects online user feedbacks for a product and categorizes the user feedbacks into three different groups (i.e., promoters, passives, and detectors) based on the rating. Based on the verbatims (i.e., text explaining their ratings) identified from the user feedbacks, different topics may be identified for the feedbacks (such as reliability, performance, ease of use, update, value, etc.) related to the product. For each identified topic, the user feedbacks are then further classified into three different subgroups (i.e., on-topic, off-topic, and no-verbatim) in each of the three categorized groups (i.e., promoters, passives, and detectors). Accordingly, a total of nine subgroups are identified for each topic for the collected online user feedbacks. In calculating the NPS uplift for each topic, the disclosed method and system assume that if concerns from on-topic feedback users and a similar portion of no-verbatim users are resolved, these user feedbacks can then be moved from the passive and detector groups into the promoter group, and thus the calculated new NPS (i.e., the adjusted NPS) will include an uplift for the overall NPS for the product. The NPS uplift (i.e., adjusted NPS-NPS) then reflects this uplift for that topic. Different topics may have different NPS uplift values after calculation. A topic that is ranked the top among the topics is determined to have a priority of management for immediate action.

The technical solution described herein focuses on providing an automatic feedback tracking notification system that monitors online user feedbacks in real-time to automatically detect top issues that deserve immediate action. In other words, the technical solution focuses on the specific improvement in computer capabilities, that is, providing an automatic system that identifies imminent computer and network problems to be solved. In some implementations, the technical solution may allow a quick resolution (e.g., automatic reply) to be achieved for these feedbacks. That is, instead of merely passively collecting user feedbacks, an online user feedback platform disclosed herein may actively monitor the content of user feedbacks and, in some implementations, even provide an instant response to an issue raised in a feedback. By actively and automatically identifying and responding problems to be solved, the technical solution may reduce computer and network resources otherwise used. The online user feedback platform disclosed herein is thus more interactive and more responsive as compared to other existing online platforms.

The features and advantages described herein are not all-inclusive and many additional features and advantages will be apparent to one of ordinary skill in the art in view of the figures and the following description.

Error! Reference source not found. is a block diagram of an example online user feedback management system 100. As shown, the system 100 includes an online user feedback management server 101, and one or more client devices 103a-103n coupled for electronic communication with the server via a network 109. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of online user feedback management servers 101, client devices 103a-103n, or networks 109.

The network 109 may be a conventional type, wired and/or wireless, and may have numerous different configurations including a star configuration, token ring configuration, or other configurations. For example, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a-103n (or collectively client device 103) may include virtual or physical computer processors, memor(ies), communication interface(s)/device(s), etc., which, along with other components of the client device 103, are coupled to the network 109 via signal lines 113a-113n for communication with other entities of the system 100. In one implementation, the client devices 103a-103n, accessed by users 125a-125n via signal lines 115a-115n respectively, may send and receive data to and from other client device(s) 103 and/or the online user feedback management server 101, and may further analyze and/or process the data. For example, the client devices 103a-103n may communicate with the online user feedback management server 101 to transmit online user feedbacks to and receive responses prepared for the feedbacks from the online user feedback management server 101. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

As depicted, a client device 103 includes an online user feedback monitoring unit 135. For example, the client device 103a includes an online user feedback monitoring unit 135a, and the client device 103n includes an online user feedback monitoring unit 135n. In one implementation, the user 125a may be a user who provides an online user feedback for a product or a service he received or a website he browsed. The online user feedback monitoring unit 135a installed on the client device 103a may be configured to generate a user interface allowing a user or customer to leave a feedback for a product, service, or website. Responsive to a user-initiated request from the user 125a to provide a feedback, an interactive window may be presented to the user 125a to allow the user 125a to input the feedback (e.g., respond to a received survey or an embedded survey). The interactive window may include a rating tool and/or a comment area for the user 125a to provide comments. The interactive window may further include an image insert, attach, or paste function for image inclusion in a user feedback. The online user feedback monitoring unit 135a may be also configured to receive a response prepared by the online user feedback management server 101, and then present the response, in a same or different user interface used by the survey, for viewing by the user 125a. The online user feedback monitoring unit 135 will be described in more detail below with reference to FIG. 2A.

The online user feedback management server 101 may be a computing device that communicates with one or more client devices 103 via a signal line 111 and the network 109 to provide topic identification and response generation for the one or more client devices 103. In one implementation, the online user feedback management server 101 receives an online user feedback from the user 125a via the client device 103a. The online user feedback may include a rating score and/or a verbatim (e.g., comments from the user 125a). The rating score may indicate an overall rating for a service or product he received or a website he viewed. In some implementations, the rating score may include a plurality of rating scores for different areas related to a product, service, or website. The verbatim may include text provided by the user 125a to provide an opinion for the product, service, or website he received or viewed. For example, the user 125a may raise one or more issues related to the product, service, or website from his point of view. Accordingly, the online user feedback management server 101 may first identify one or more topics from the verbatim if there is one in the feedback.

In one implementation, the online user feedback management server 101 may receive a plurality of online user feedbacks from different users or customers for the product, service, or website within a certain period of time. The online user feedback management server 101 may thus identify a plurality of topics or areas related to the product, service, or website. Exemplary topics may include reliability, performance, value, missing features, ease of use, updates, etc. In one implementation, the online user feedback management server 101 may further identify a topic(s) with a priority, where the priority topic means that the issues related to the topic are more important and thus require a more instant action compared to other identified topics. After identification of the priority topic, the online user feedback management server 101 may further implement certain immediate actions to address issues related to the topics. For example, the online user feedback management server 101 may modify the survey, used to collect the feedback, to include more sub-topics related to the topic in the survey, may generate an alert to alarm relevant personnel in charge and/or automatically forward the relevant feedbacks and/or the priority topic to the personnel in charge. In some implementations, the online user feedback management server 101 may provide a reply in response to an issue raised in a feedback. Certain other actions that may be implemented by the online user feedback management server 101 are also possible and contemplated.

As illustrated in FIG. 1, the online user feedback management server 101 includes an online user feedback management application 105, which is a server-side application that communicates with the client-side application, e.g., an online user feedback monitoring unit 135a, residing on a client device 103a to implement online user feedback management. The online user feedback management application 105 (which may be also referred to as "online feedback management platform") may include various models or tools for topic identification and prioritization, such as machine learning models for semantic analysis and topics identification, certain algorithms for determining a priority topic, certain strategy forming tools for preparing a response to an issue raised in a feedback, etc. The online user feedback management application 105, including the various models or tools, will be described in detail below with reference to FIG. 2B.

In one implementation, the online user feedback management server 101 also includes a data store 107. The data store 107 stores any information related to the operations described herein, such as the collected online user feedbacks, the identified plurality of topics, the determined topic(s) with a priority, the prepared responses, etc.

Figure 2A:
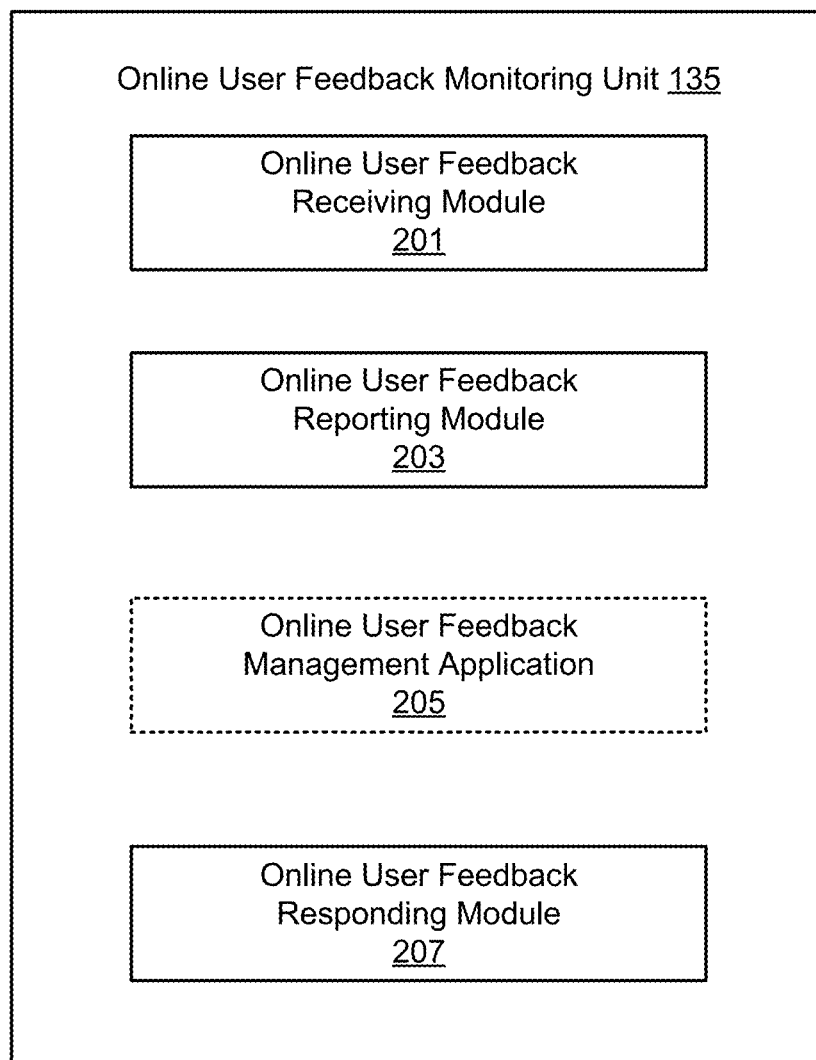
FIG. 2A is a block diagram of example components of an online user feedback monitoring unit residing on a client device.

Referring now to FIG. 2A, a block diagram of example components of an online user feedback monitoring unit 135 residing on a client device 103 is described. The online user feedback monitoring unit 135 includes hardware and/or software logic for implementing certain operations in online user feedback management. In one implementation, the online user feedback monitoring unit 135 includes an online user feedback receiving module 201, an online user feedback reporting module 203, and an online user feedback responding module 207. Optionally, the online user feedback monitoring unit 135 may further an online user feedback management application 205, which may implement partial or full functions executed by the online user feedback management application 105.

The online user feedback receiving module 201 includes hardware and software logic for receiving user feedbacks provided by customers or users for a product, service, or website. In real applications, many different channels may be employed for collecting the online user feedbacks. Today's omnichannel customer service technology allows companies to engage with customers wherever they are and capture feedback at every customer touchpoint. This then provides a more holistic view to the traditional approaches where companies engage through just a few channels, often leading to incomplete information about customer preference, behavior, and satisfaction. Exemplary channels for collecting online user feedbacks include, but are not limited to, email, short message service (SMS), social media, in-product feedback, in-app feedback, website feedback, etc.

Reaching customers via emails is a trusted, cost-effective and familiar way to gather feedback. Like email, SMS is also a channel that a lot of people use, even if they're not enthusiastic users of digital communications. SMS is great for collecting a small amount of feedback at a time, e.g., for a single purchase. Social media is a great place to collect customer feedback via listening and sentiment analysis. Whereas SMS provides an active response to a direct question (for example, how satisfied are you with your recent purchase?), social media may help gather feedback from customers that was provided indirectly (where a question was not asked). In-product feedback is another channel that works best for a digital product as a feedback request feature can be added directly in the product interface, i.e., on a home screen or main dashboard. If there's a product malfunction or issue, this method will allow a notification to be received right away. Mobile customer interactions are becoming increasingly popular and companies may capitalize on the ease of submitting in-app feedback. This allows organizations to seamlessly embed key questions and feedback forms in the app itself. Profile and action criteria may ensure that a right feedback is solicited at an appropriate time. For website feedback, a feedback tab or dedicated page may be added to a website, or a web intercept may be used. As can be seen, many different channels may be used for collecting online user feedbacks, including other channels not listed or discussed here. With these different channels, many different user feedbacks may be effectively collected.

The online user feedback reporting module 203 includes hardware and software logic for recording and/or reporting online user feedbacks collected from users or customers through different channels. For example, the online user feedback reporting module 203 may transmit the feedbacks input by the users to the online user feedback management server 101. The feedbacks may be transmitted through internet, e.g., through the network 109. In some implementations, depending on the configuration, if a mobile device 103*a* includes an online user feedback management application 205, the feedbacks may be directly forwarded to the online user feedback management application 205 within the client device 103*a*, but not transmitted to the online user feedback management server 101.

The online user feedback management application 205 includes hardware and software logic for implementing partial or full functions of the online user feedback management application 105. For example, the online user feedback management application 205 may implement certain topic identification, identifying a priority topic, and/or prioritizing actions for the priority topic, as will be described in detail in FIG. 2B. In some implementations, the online user feedback management application 205 may be a light version of the online user feedback management application 105, and thus include some simple processing, but leave some complex computations to the online user feedback management application 105, which be located on a cloud-based online user feedback management server 101 that has more computation power.

In some implementations, the online user feedback monitoring unit 135 may include an online user feedback responding module 207. The online user feedback responding module 207 includes hardware and software logic for optimizing the customer service technology by providing an instant or a quick response to a user feedback. In one example, if a priority topic is identified and a proper strateg(ies) or response(s) to address issues related to the priority topic is formed, the proper strategy and response may be instantly provided to a future user feedback that raises a same or similar issues related to the topic, or provided to a previous feedback that raised the issues related to the topic as a follow-up. In another example, if a priority topic is identified, a survey may be instantly modified to include more sub-topics related to the priority topic. For example, if it is determined that the performance for a product is the priority topic based on the collected user feedbacks, a survey may be instantly modified to include more sub-topics related to the performance of the product. Taking a laptop as an example, if the performance is identified as the priority topic, sub-topics, such as screen performance, battery performance, noise performance, heat performance, etc., may be included in a modified survey and presented to customers and users. The modified survey may be delivered to a same or different user or customer if delivered by email or SMS or as a new survey when embedded or deployed into social media, in-product feedback, in-app feedback, website feedback for other users to input their feedback. In his way, the online user feedback application/platform becomes more interactive and more responsive.

Figure 2B:
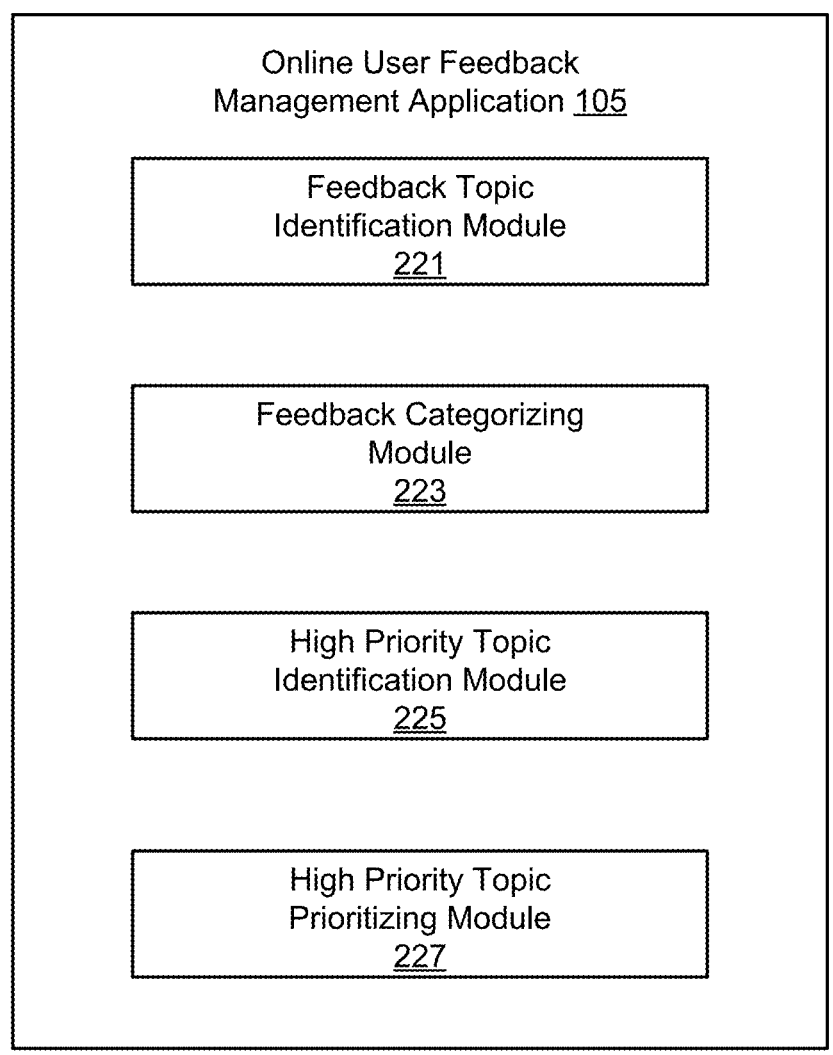
FIG. 2B is a block diagram of example components of an online user feedback management application residing on an online user feedback management server.

FIG. 2B is a block diagram of example components of an online user feedback management application 105 residing on the online user feedback management server 101. The online user feedback management application 105 includes hardware and/or software logic for identifying topics from user feedbacks and prioritizing a priority topic. In one implementation, the online user feedback management application 105 includes a feedback topic identification module 221, a feedback categorizing module 223, a high priority topic identification module 225, and a high priority topic prioritizing module 227.

The feedback topic identification module 221 includes hardware and software logic for identifying topics for the feedbacks collected from one or more client devices 103. In one implementation, one or more feedbacks received from the client device 103 may include verbatim or comments provided by the users 125. The feedback topic identification module 221 may implement a certain semantic analysis to identify text from the verbatim or comments. For one example, the feedback topic identification module 221 may implement optical character recognition to convert the verbatim or comments into machine-encoded text. For another instance, the feedback topic identification module 221 may use one or more machine learning models to identify machine-encoded text from the verbatim or comments. In one implementation, based on the identified text, the feedback topic identification module 221 may identify one or more topics from the verbatim or comments. The feedback topic identification module 221 may use keywords to identify one or more topics. In one implementation, each topic may include a library of keywords that are related to the topic and are product, service, or website-specific. For example, a library of keywords for different products, services, or websites may include different keywords for the same topic "performance." The library of keywords may be predefined and dynamically updated based on the content of received feedbacks (e.g., based on the advancement of the technology). By comparing the converted machine-encoded text with keywords in different libraries for different topics, a set of topics may be identified for each received feedback. In some implementations, more than one topic may be identified for a single online user feedback. It is to be noted that, beside keyword comparison, many other approaches that determine whether a given feedback matches a given topic are also possible and contemplated in the present disclosure.

The feedback categorizing module 223 includes hardware and software logic for categorizing the received feedbacks into different groups. In one implementation, the feedback categorizing module 223 may group the received feedbacks based on the rating scores provided by the customers or users. For example, based on the rating scores, the received feedbacks may be grouped into three different groups, i.e., a promoter group, a passive group, and a detractor group. Depending on the configurations, when a survey is designed and sent out or deployed, different types of scoring may be employed. In one example, scores of 1-10 may be used. At this moment, a feedback with a score of 9 or 10 may be categorized into a promoter group, a feedback with a score of 7 or 8 may be categorized into a passive group, and a feedback with a score of 1-6 may be categorized into a detractor group. In another example, scores of 1-5 may be used instead. At this moment, a feedback with a score of 5 may be categorized into a promoter group, a feedback with a score of 4 may be categorized into a passive group, and a feedback with a score of 1-3 may be categorized into a detractor group. Other types of scoring are also possible and contemplated.

Figure 3A:
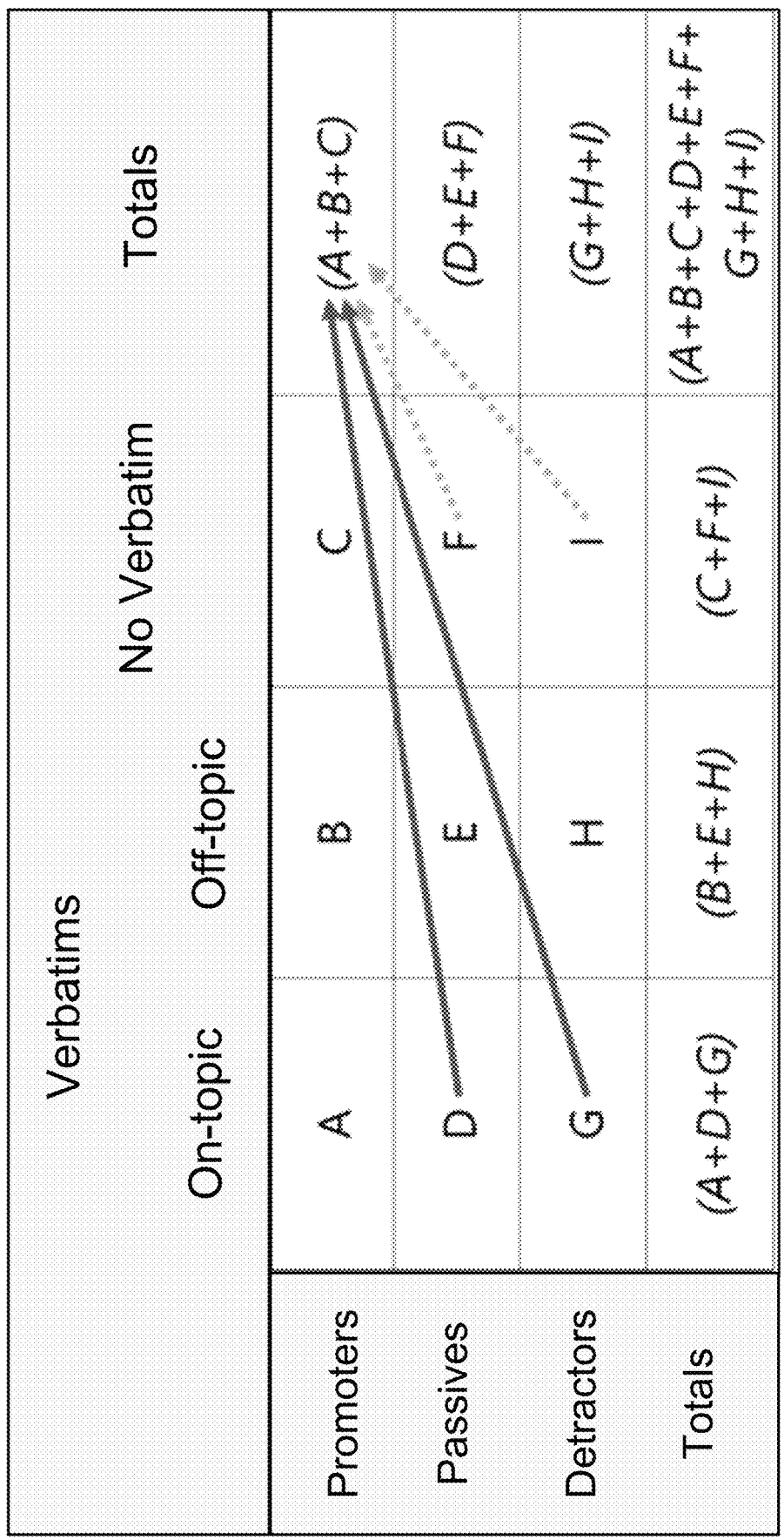
FIG. 3A is a block diagram of an example categorization of online user feedbacks into a plurality of groups and an example movement of a subset of the online user feedbacks among the plurality of groups.

In one implementation, the feedback categorizing module 223 may further categorize the feedbacks based on the verbatim and topics included in the verbatim. For example, for feedbacks categorized into each of the promoter group, passive group, and detractor group, these feedbacks may be further categorized into three subgroups for each identified topic. The three sub-groups may be an on-topic group, an off-topic group, and a no-verbatim group. The on-topic sub-group includes feedbacks that contain verbatim or comments related to the topic. The off-topic sub-group includes feedbacks that contain verbatim or comments but these verbatim and comments are unrelated to the topic. The no-verbatim group includes feedbacks that contain no verbatim or comments. In some implementations, for different topics related to a product, service, or website, the received feedbacks may be categorized into the different sub-groups. That is, the categorization for sub-groups may be topic-dependent, and each sub-group may contain different feedbacks for a different topic. FIG. 3A shows one exemplary categorization of feedbacks for one topic. As can be seen, there are three groups (i.e., promoter, passive, and detractor groups) and nine sub-groups (each group has three sub-groups).

The high priority topic identification module 225 includes hardware and software logic for identifying a priority topic from a plurality of topics related to a product, service, or website. That is, after identifying a plurality of topics from the feedbacks and categorization of these feedbacks, the high priority topic identification module 225 may then determine a priority topic based on the categorization, so that a most negative topic (or a topic with most serious issues) may be given the priority of management for immediate action.

In one implementation, the high priority topic identification module 225 may determine the priority topic by calculating a net promoter score (NPS) uplift for each topic and then selecting a topic with the largest value as the priority topic. The NPS uplift for each topic may quantify the maximum possible improvement in overall product NPS for each topic, where the NPS is a general customer loyalty metric that measures how likely the customers are to recommend a product, service, or website to a friend. The high priority topic identification module 225 may make two assumptions in calculating the NPS uplift for each topic. First, for a given topic, assume that all feedbacks in the passive and detractor groups that contain the topic in the text feedback are movable by resolving the issues represented in the topic. Second, assume that similar proportions among feedbacks that do not provide text feedback are similarly movable. For the computation of the NPS uplift for a given topic, the first step is to construct a frequency table based on rating scores (promoters, passives, detractors) and the text feedback (no text, feedback related to the topic of interest, feedback unrelated to topic), as can be seen in FIG. 3A.

Next, movable feedbacks in the detractor group (feedbacks in the detractor/passive/promoter group may simply be referred to as "detractors/passives/promoters") and movable passives are determined and taken into account in calculating the NPS uplift. Movable detractors may be calculated according to the following Formula (1):

$$\text{Movable Detractors} = G + \left(\frac{G}{G+H}\right) \times I \qquad (1)$$

where G represents detractors that explicitly covered the given topic (e.g., performance). If all issues related to this topic are resolved, the detractors may be then recategorized from the detractor group to the promoter group. The second term (G/[G+H]) in the equation is the proportion of feedbacks that explicitly cover the given topic. This term may be used to estimate the proportion of detractors that did not provide text feedback but may be similarly affected by the issues associated with the given topic. In some implementations, a similar calculation may be performed to estimate movable passives, as shown in the following Formula (2):

$$\text{Movable Passives} = D + \left(\frac{D}{D+E}\right) \times F \quad (2)$$

Next, NPS and $NPS_{adj}$ may be respectively calculated according to the following Formula (3) and Formula (4):

$$NPS = \frac{\text{Promoters} - \text{Detractors}}{\text{Total Reponse}} = \frac{(A+B+C)-(G+H+i)}{A+B+C+D+E+F+G+H+I} \quad (3)$$

$$NPS_{adj} = \frac{\left(A+B+C+G+\left(\frac{G}{G+H}\times I\right)+D+\left(\frac{D}{D+E}\times F\right)\right)-\left(H+\left(\frac{H}{G+H}\times I\right)\right)}{A+B+C+D+E+F+G+H+I} \quad (4)$$

The NPS uplift may be then calculated according to the following Formula (5):

$$NPS \text{ uplift} = NPS_{adj} - NPS \quad (5)$$

By using Formula (5), the NPS uplift for each of the plurality of topics related to a product, service, or website may be then calculated. A topic with the largest NPS uplift value may be then considered as the priority topic.

In real applications, a margin of error for NPS may be calculated before deployment of the above calculation into the high priority topic identification module 225, to ensure that the NPS uplift works as expected. With any metric, it is important to characterize its variability to assess the statistical significance of differences over time. Calculating a confidence interval provides a convenient method for doing this. The 95% confidence interval is also referred to as the margin of error (MoE). Calculating NPS MoE may be facilitated by recoding NPS data as follows: individual ratings are converted such that detractors are coded with a value of −100, passives with a value of 0, and promoters with a value of 100. In doing this, the NPS calculation simply becomes the arithmetic mean, or average, of the recoded values. That is, NPS may be calculated according to the following Formula (6):

$$NPS = \frac{\Sigma x}{n} \quad (6)$$

A key benefit to this approach is that it also makes it easy to calculate the variance and standard deviation for NPS using familiar formulas from basic statistics, as shown in the following Formula (7) and Formula (8):

$$VAR_{NPS} = \frac{\sum (x-NPS)^2}{n-1} \quad (7)$$

$$SD_{NPS} = \sqrt{\frac{\sum (x-NPS)^2}{n-1}} = \sqrt{VAR_{NPS}} \quad (8)$$

The crucial part of calculating the MoE is the standard error, which may be calculated according to the following Formula (9):

$$SE_{NPS} = \sqrt{\frac{VAR_{NPS}}{n-1}} \quad (9)$$

When working with aggregated data, the following Formula (10) may be used instead.

$$SE_{NPS} = \sqrt{\frac{(100-NPS)^2 \times \frac{\#\text{ Promoters}}{n} + (0-NPS)^2 \times \frac{\#\text{ Passives}}{n} + (-100-NPS)^2 \times \frac{\#\text{ Detractors}}{n}}{n-1}} \quad (10)$$

Finally, the MoE may be calculated as the 95% confidence interval according to the following Formula (11):

$$MoE_{NPS} = 1.96 \times SE_{NPS} \quad (11)$$

In one implementation, a margin of error for NPS uplift may be also calculated to ensure that NPS uplift works as expected. Since NPS max uplift is the difference between 2 NPS scores taken from the same sample(s), it is possible to calculate a standard error for this difference using a formula for the difference between means for correlated measures, as shown in the following Formula (12).

$$SE_{maxuplift} = \sqrt{\frac{VAR_{NPS} + VAR_{Adjusted\,NPS} - 2rSD_{NPS}SD_{Adjusted\,NPS}}{n-2}} \quad (12)$$

where r is the correlation between the original NPS and the adjusted NPS, which can be represented based on the NPS and the respective observations in each of the groups, as shown in the following Formula (13):

$$r = \frac{r\sum_{G} n_g(Val_{NPS} * Val_{AdjustedNPS}) - \sum_{G} n_g(Val_{NPS}) \sum_{G} n_g(Val_{AdjustedNPS})}{\sqrt{\left[n\sum_{G} n_g(Val_{NPS}^2) - \left(\sum_{G} n_g Val_{NPS}\right)^2\right]\left[n\sum_{G} n_g(Val_{AdjuestedNPS}^2) - \left(\sum_{G} n_g Val_{AdjuestedNPS}\right)^2\right]}} \quad (13)$$

where n represents the total number of observations, $n_g$ represents the observations that belong to group g. For this context, a group is any of the 5 potential combinations below (Table 1) derived from the movement of feedbacks between NPS categories:

TABLE 1

| Original | Adjusted |
|---|---|
| Promoter | Promoter |
| Passive | Promoter |
| Passive | Passive |
| Detractor | Promoter |
| Detractor | Detractor |

$Val_{NPS}$ and $Val_{AdjustedNPS}$ correspond to the values of both NPS measures in a respective group. For example, for the first group above, both values will correspond to 100 (as it is the score associated with promoters).

As before, the MoE for NPS max uplift may be calculated as the following Formula (14):

$$MoE_{maxuplift} = 1.96 \times SEmaxuplift \quad (14)$$

Note that this approach simply accounts for the variability in the differences between NPS and the adjusted NPS used to calculate the NPS max uplift metric. This approach does not consider topic misclassification or the fact that population-wide dissatisfaction with a given topic area is estimated using only data from users who have provided verbatim.

Figure 3B:
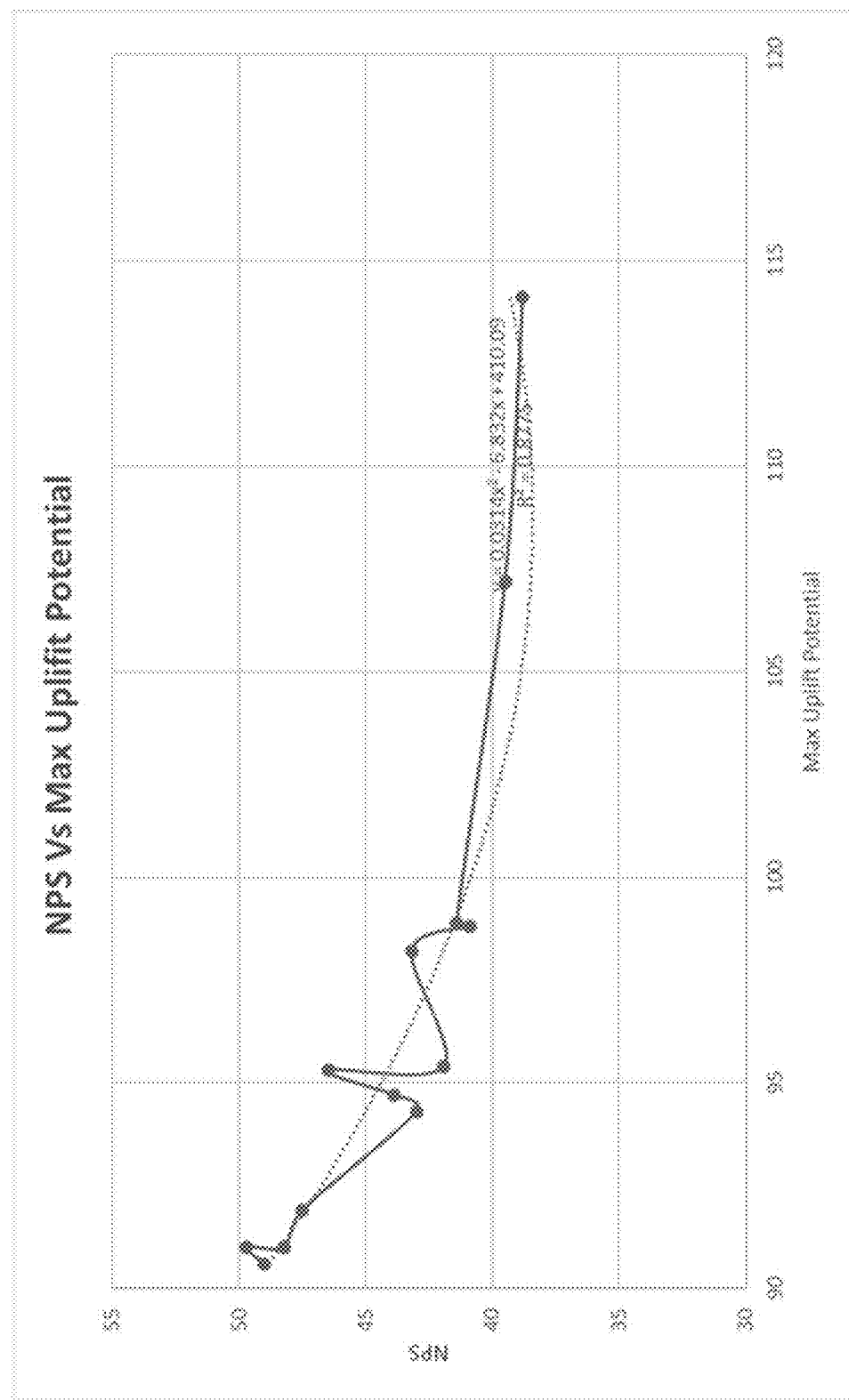
FIG. 3B is an example graph illustrating a correlation between a net promoter score (NPS) and NPS max uplift.

In one implementation, the relationship between NPS max uplift and NPS may be further validated. Since a user verbatim may contain more than one topic, the NPS uplift calculation may overestimate as it cannot be ascertained which topic or topics will be important for conversion. Therefore, the sum of NPS uplift of all topics and the prevailing NPS could be more than 100. However, the relationship between the sum of NPS uplift of all topics and NPS is strong as illustrated in FIG. 3B for one product. Any increase in NPS max uplift causes a reduction in NPS with $R^2$ of 0.87. That is, from the data shown in FIG. 3B, it can be seen that NPS uplift can work as expected in identifying the priority topic.

Referring back to FIG. 2B, after identification of the priority topic, the high priority topic prioritizing module 227 may further prioritize the management of the identified high priority topic for immediate action. That is, the limited resource is first applied to the priority topic for immediate action. The immediate action may include, but are not limited to, alerting the personnel in charge of the issues related to the topic, modifying the survey used to collect user feedbacks, collecting responses for issues related to the topic, providing the responses related to the issues to the past or future customers that raise the same or similar issues, etc.

In alerting the personnel in charge of the issues related to the topic, the high priority topic prioritizing module 227 may automatically notify the corresponding personnel in charge through email, message, or other communication channels. In the notification, the high priority topic prioritizing module 227 may automatically select the relevant feedbacks that cover the topic and send these feedbacks as a linked file, as an attachment, or in other formats. In some implementations, the high priority topic prioritizing module 227 may further highlight the issues related to the topic in the relevant feedbacks. In modifying the survey, the high priority topic prioritizing module 227 may automatically modify a survey by adding certain sub-topics related to the priority topic, so that more details may be collected for the issues related to the topic. For example, the high priority topic prioritizing module 227 may modify a survey for a laptop to include screen performance, battery performance, noise performance, heat performance, etc., in the survey when the performance of the laptop is identified as the priority topic. In collecting the responses to the issues related to the topic, the high priority topic prioritizing module 227 may collect the responses prepared by the personnel in charge, including the currently available possible solutions to the issues and/or proposed plan to address the issues if no current solutions are available. Once the proper responses are collected, these responses may be forwarded to online user feedback monitoring unit 135 on the client devices 103, so that a proper response may be provided to the corresponding customers through email or SMS or deployed in a relevant user interface (e.g., a reply part in a feedback collecting platform presented on social media, in-product feedback, in-app feedback, website feedback, etc.). In some implementations, when the feedbacks that contain the same or similar issues are received in the future, the responses may be automatically retrieved from the client devices 103 and/or the online user feedback management server 105 and presented to the customers right away. In this way, quick response and direct interaction with customers may be achieved, which facilitates the interaction between customers and a company providing the product, service, or website. The management of online user feedbacks is described further in detail below with reference to FIGS. 4-5. The description of the management is focused on a product. However, the disclosed method is not limited to a product, but can be applied to a service, a website, an institute, an employer, or any other proper entities that have certain issues to address through a proper online user feedback collection platform.

Figure 4:
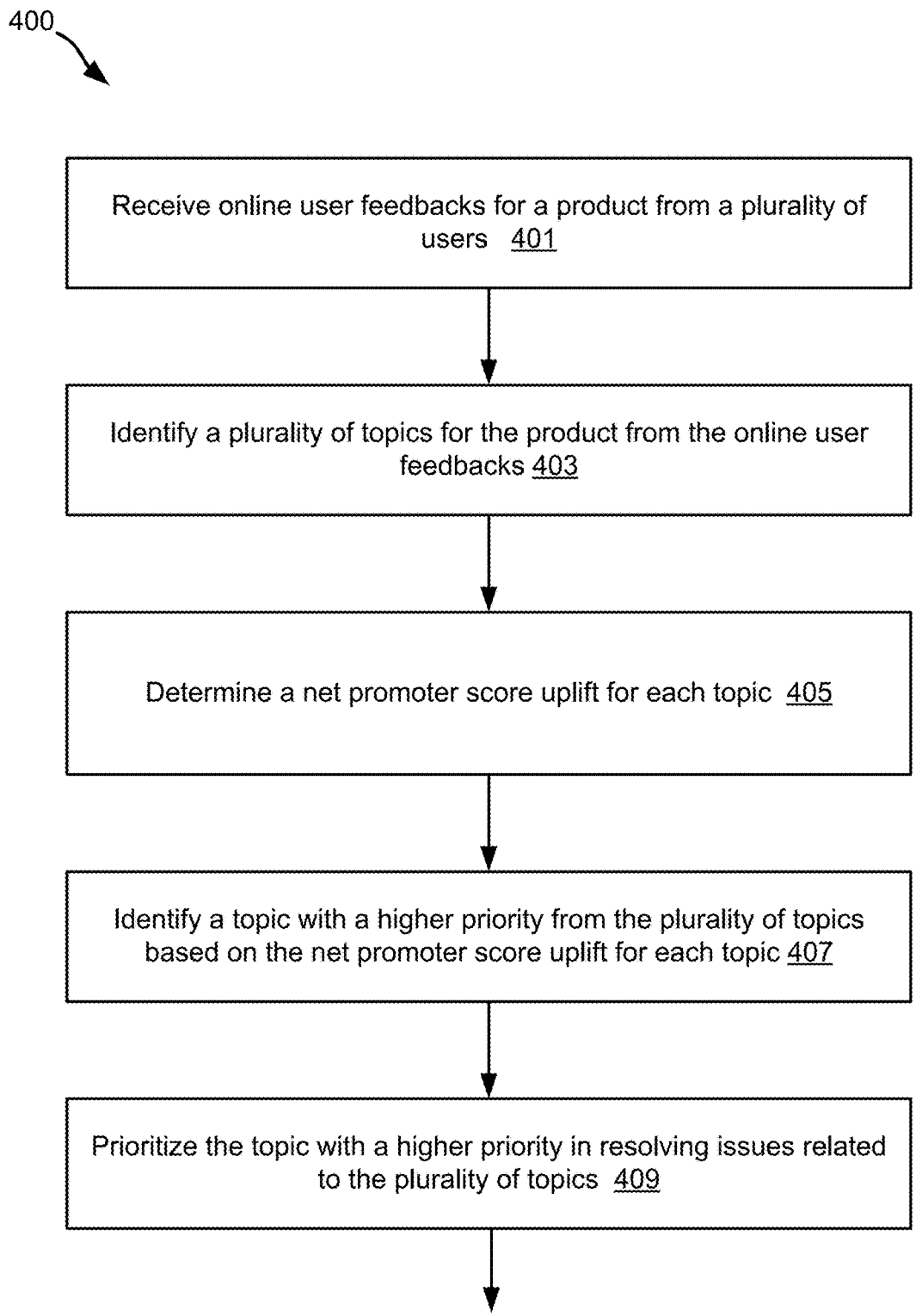
FIG. 4 is a flowchart of an example method for online user feedback management.

Referring now to FIG. 4, an example method 400 for online user feedback management is described. The method is implemented by the online user feedback management server 101 communicating with the client devices 103a-103n. A large number of user feedbacks may be received, but it is difficult to provide an instant response to each issue raised in the feedbacks, especially when a certain period of time is required to form a proper response strategy for each issue. In addition, due to the different preferences and interests from different users, the user online feedbacks may be immersed with many different topics and thus the management of user feedback system faces problems to address so many user feedbacks without a priority. The method 400 addresses such problems.

At block 401, the online user feedback management server 101 receives online user feedbacks for a product from a plurality of users 125a-125n. The feedbacks may be received through the client devices 103a-103n. The user feedbacks may be a user-initiated response to a survey provided to the user on-demand or in general. The survey may include a rating part that has a scoring scale of 1-10, 1-5, or so on. The survey may further include a comment area that allows a user to provide input, including the text, image, or other formats of content. The survey may be also in a format that includes one or more questions that each may also include a corresponding set of answers for a user to select. In some implementations, the survey may include a plurality of ratings for different areas of the product. It is to be noted that the survey is not limited to the above description and can be in many other different formats. In some implementations, the survey may be deployed to certain platforms and/or sent to the randomly selected or target users. Thus, the channels used for collecting user feedbacks may include email, SMS, social media, in-product feedback, in-app feedback, website feedback, etc.

At block 403, the online user feedback management server 101 identifies a plurality of topics from the online user feedbacks. To identify the topics from the online user feedbacks, the online user feedback management server 101 may first determine whether a user feedback contains verbatim or comments. If a user feedback contains verbatim or comments, the verbatim or comments may be first converted into machine-encoded text. Different techniques may be applied to convert the user feedbacks into the machine-encoded text. These techniques may include, but are not limited to, optical character recognition, machine learning models, etc. The machine-encoded text may be then compared to keywords related to each topic, to identify one or more topics from each user feedback. In some implementations, more than one topic may be identified from single user feedback. By identifying the topics related to all received user feedbacks, the topics for the user feedbacks related to the product may be then identified.

At block 405, the online user feedback management server 101 determines a NPS uplift for each identified topic. Here, a NPS uplift is calculated based on a NPS for the product that is calculated based on the rating, and an adjusted NPS (i.e., $NPS_{adj}$) that is calculated based on the rating and/or verbatim, as further described in detail in FIG. 5. The calculated NPS uplift for each topic may represent the maximum potential improvement to the overall NPS for the product that can be gained by fully addressing issues within a given topic.

At block 407, the online user feedback management server 101 identifies a priority topic based on the calculated NPS uplift for each topic. To identify the priority topic, the calculated NPS uplifts for the identified topics related to the product are compared, and a topic with the largest value in NPS uplift is considered as the priority topic. That is, that topic requires a priority of management for immediate action.

At block 409, the online user feedback management server 101 prioritizes the priority topic in resolving the issues related to the plurality of topics. That is, in addressing the issues raised in the feedbacks from customers, the issues related to the priority topic may be addressed first, which allows the limited resource to first be put into the key issues in promoting the product in the market. The prioritized actions may include sending alerts to the personnel in charge of the priority topic, modifying the survey to include certain sub-topics related to the priority topic, collecting responses to the issues related to the priority topic, providing the collected responses to the previous users that have raised the issues and/or to future users that may raise the same or similar issues.

As described in method 400, the technical solution described herein includes monitoring the content of online user feedbacks in real-time, to automatically identify topics from user feedbacks and prioritize a priority topic from the identified topics. The technical solution focuses on the specific improvement in computer capabilities, that is, providing an automatic system that identifies imminent computer and network problems to be solved. The technical solution therefore may allow a quick resolution (e.g., automatic reply) to be achieved for these feedbacks. That is, instead of merely passively collecting user feedbacks, an online user feedback platform disclosed herein may actively monitor the content of user feedbacks and, in some implementations, even provide an instant response to an issue raised in a feedback. By actively and automatically identifying and responding problems to be solved, the technical solution may reduce computer and network resources otherwise used. In this way, a more responsive and interactive online user feedback platform may be obtained.

Referring now to FIG. 5, an example method 500 for calculating a NPS uplift for each topic is described. The method is also implemented by the online user feedback management server 101. At block 501, the online user feedback management server 101 automatically categorizes each of the received online user feedbacks into one of a plurality of groups based on the rating score for each topic and semantic analysis of the online user feedbacks. In one implementation, the online user feedback management server 101 first categorizes the feedbacks into three groups based on the rating scores provided for the feedbacks. The three groups may include a promoter group, a passive group, and a detractor group. Next, within each promoter, passive, and detractor group, the feedbacks are further categorized into three different sub-groups, that is, on-topic, off-topic, and no-verbatim subgroups based on the semantic analysis. Feedbacks that contain no verbatim are categorized into the no-verbatim subgroup, feedbacks containing the verbatim or comments that are related to the topic are categorized into the on-topic group, and feedbacks containing verbatim or comments but these verbatim or comments are not related to the topic are categorized into the off-topic group. Accordingly, the user feedbacks may be categorized into a total of up to nine groups for a given topic.

At block 503, the online user feedback management server 101 identifies a subset of online user feedbacks that can be moved among the plurality of groups based on an assumption that one or more issues related to the topic are resolved. For example, if all issues related to the given topic are resolved, user feedbacks in the detractor and passive groups that are also on-topic may not have any issues to address anymore and would be in the promoter group if re-categorization is conducted. Certain portions of user feedbacks in the passive and detractor groups that provide no verbatim may also be moved to the promoter group. Accordingly, if assume all the issues related to the topic are resolved, a subset of feedbacks in the passive and detractor groups may be moved to the promoter group. These feedbacks may be considered as movable passives or movable detractors.

At block 505, the online user feedback management server 101 determines a net promoter score uplift for each topic based on a movement of the subset of the collected online user feedbacks. To calculate the NPS uplift, after the movement of the movable passives and movable detractors, an adjusted NPS may be calculated based on the moved feedbacks. The calculated adjusted NPS may be compared to the NPS calculated without the movement, and the difference between the two may be then considered as the NPS uplift for each topic. This NPS uplift for each topic may be then compared to identify a priority topic for the management for immediate action in resolving the issues related to the product, as described earlier in FIG. 4.

Figure 6:
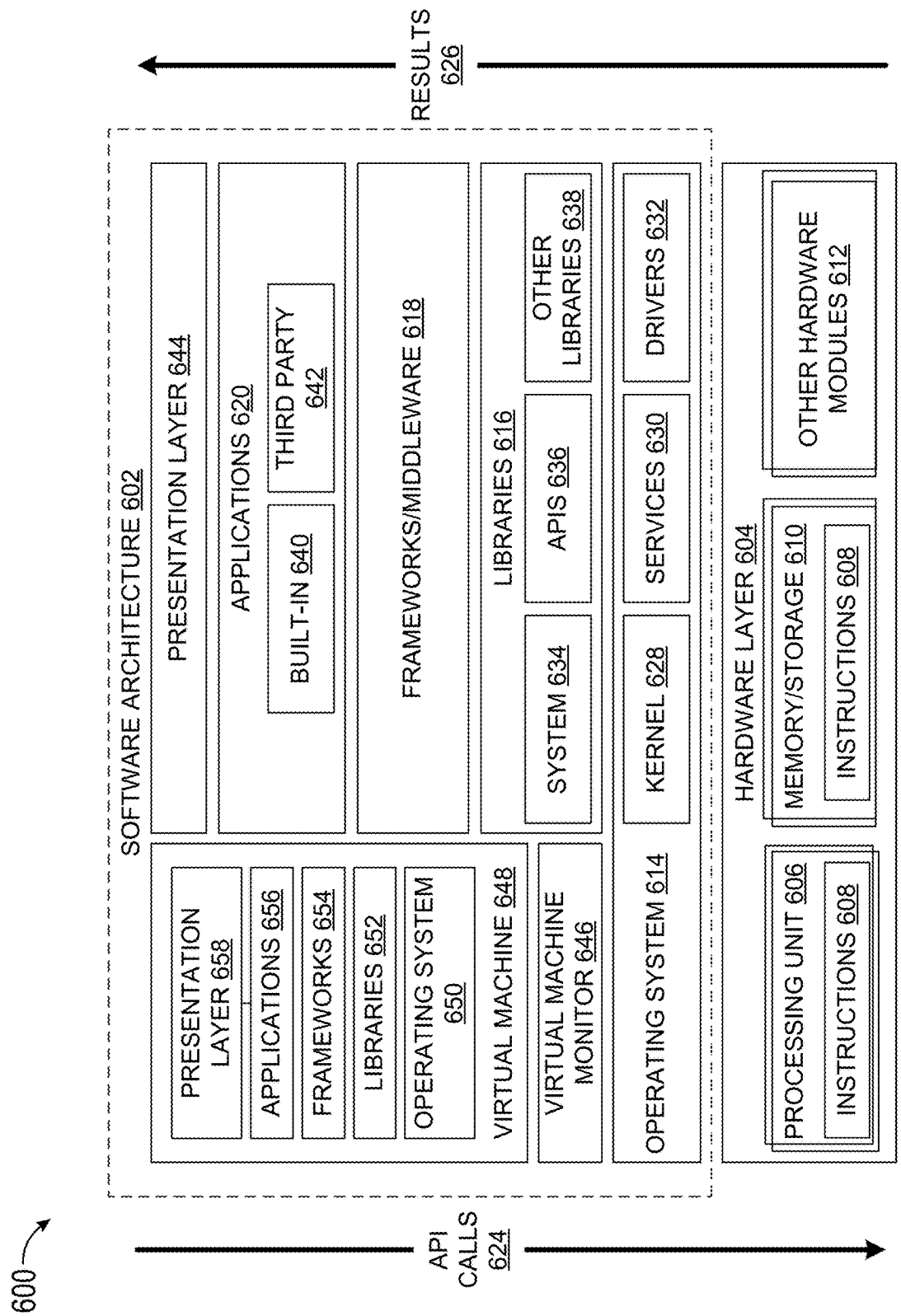
FIG. 6 is a block diagram illustrating an example software architecture.

FIG. 6 is a block diagram 600 illustrating an example software architecture 602, various portions of which may be used in conjunction with various hardware architectures herein described, which may implement any of the above-described features. FIG. 6 is a non-limiting example of software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 780. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For example, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
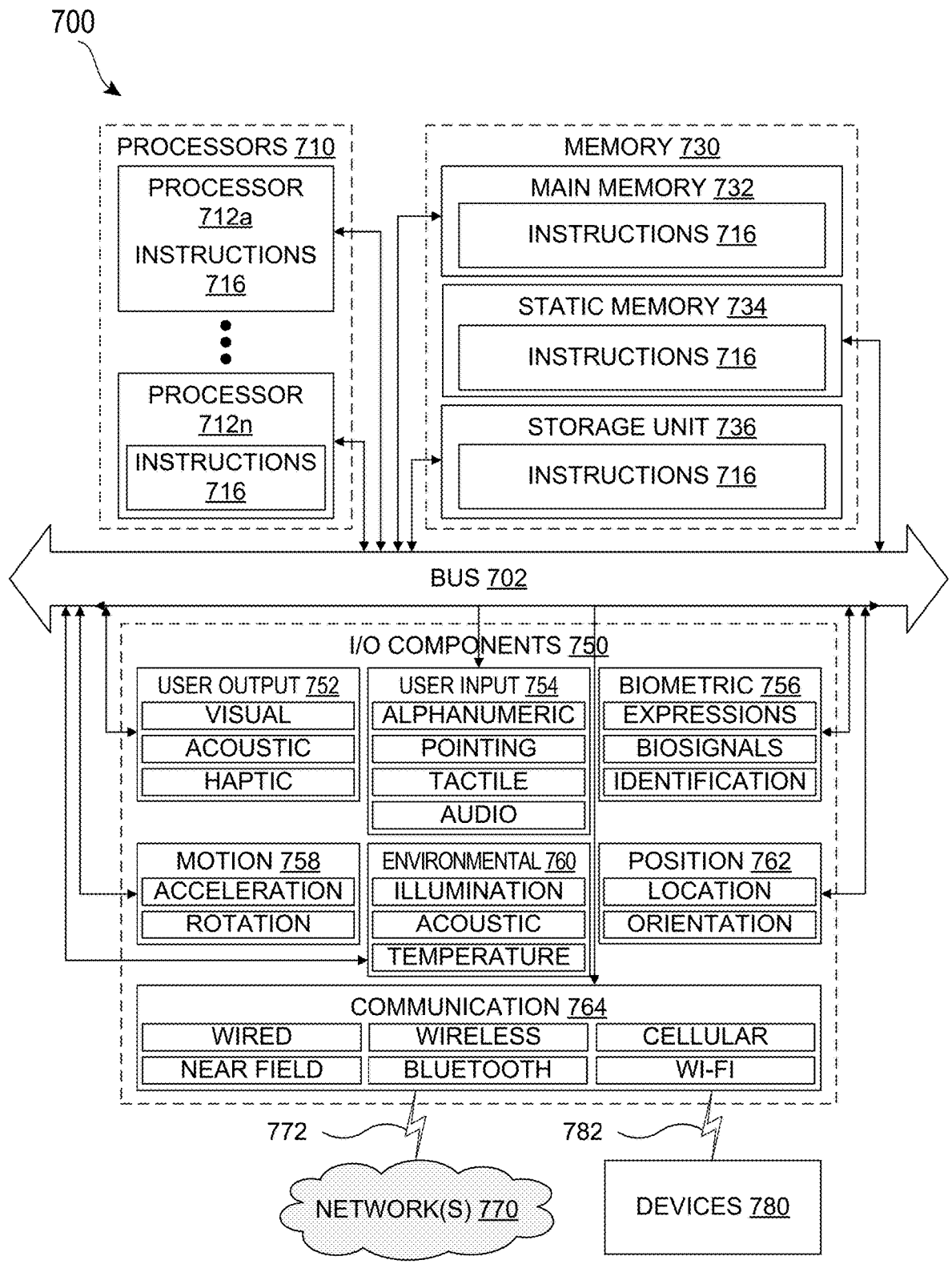
FIG. 7 is a block diagram illustrating components of an example machine configured to read instructions from a machine-readable medium.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions 716, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for managing online user feedbacks for a product, the system comprising:
   a processor; and
   a memory, coupled to the processor and configured to store executable instructions that, when executed by the processor, cause the processor to:
   receive, via a communication network, the online user feedbacks for the product from a plurality of users, the online user feedbacks being received through an online feedback management platform managing the online user feedbacks provided by the plurality of users through the communication network;
   provide each online user feedback for the product to a machine learning model for performing semantic analysis on the online user feedbacks, performing semantic analysis including at least one of implementing optical character recognition to convert verbatim in the online user feedbacks into machine-encoded text, and identifying based on text in the online user feedbacks a plurality of topics;
   receive as an output from the machine learning model the plurality of topics for the product from the online user feedbacks;
   for each topic, automatically categorize each of the received online user feedbacks into one of a plurality of groups based on a rating score provided for the product in each online user feedback and the semantic analysis of each online user feedback for the product;
   for each topic, automatically identify a subset of the online user feedbacks to be moved among the plurality of groups based on an assumption that one or more issues related to the topic are resolved;
   determine a net promoter score (NPS) uplift for each topic based on a movement of the subset of online user feedbacks, wherein the NPS uplift measures an improvement in a first NPS for the product if the one or more issues related to the topic are resolved;
   identify, from the plurality of topics included in the user feedbacks for the product, a priority topic based on the NPS uplift for each of the plurality of topics; and
   prioritize the identified topic when resolving an issue related to the plurality of topics included in the online user feedbacks.

2. The system of claim 1, wherein to automatically categorize each of the received online user feedbacks for each topic, the memory stores the executable instructions that, when executed by the processor, cause the processor to:
   automatically categorize each of the received online user feedbacks into one of a promoter, passive, and detractor groups; and
   further classify the online user feedbacks categorized into each of the promoter, passive, and detractor groups into one of an on-topic, off-topic, and no-verbatim subgroups.

3. The system of claim 2, wherein to determine the NPS uplift, the memory stores the executable instructions that, when executed by the processor, cause the processor to:
   determine the first NPS for each topic based on categorizing the received online user feedbacks into one of the promoter, passive, and detractor groups;
   determine a second NPS for each topic based on the movement of the subset of the online user feedbacks; and
   determine the NPS uplift for each topic based on the first NPS and the second NPS.

4. The system of claim 3, wherein the subset of online user feedbacks to be moved among the plurality of groups includes a set of online user feedbacks that are categorized into the passive and detractor groups when determining the first NPS and are also recategorized into the promoter group when determining the second NPS.

5. The system of claim 2, wherein to further classify the online user feedbacks, the memory stores the executable instructions that, when executed by the processor, further cause the processor to:
analyze an online user feedback to determine whether the online user feedback includes text; and
responsive to determining that the online user feedback fails to include the text, classify the online user feedback into the no-verbatim sub-group.

6. The system of claim 5, wherein the memory stores the executable instructions that, when executed by the processor, further cause the processor to:
responsive to determining that the online user feedback includes the text, for each topic, analyze the online user feedback to determine whether the text includes one or more words that are related to the topic;
responsive to determining that the online user feedback includes the one or more words that are related to the topic, classify the online user feedback into the on-topic subgroup for the topic; and
responsive to determining that words included in the online user feedback are unrelated to the topic, classify the online user feedback into the off-topic subgroup for the topic.

7. The system of claim 6, wherein to analyze the online user feedback to determine whether the text includes the one or more words that are related to the topic, the memory stores the executable instructions that, when executed by the processor, further cause the processor to recognize the one or more words included in the text using optical character recognition technology.

8. The system of claim 1, wherein to prioritize the identified topic, the memory stores the executable instructions that, when executed by the processor, further cause the processor to prioritize a provision of a response to an online user feedback related to the priority topic.

9. The system of claim 1, wherein to prioritize the identified topic, the memory stores the executable instructions that, when executed by the processor, further cause the processor to automatically modify a survey used to collect the online user feedbacks to include sub-topics related to the priority topic in collecting incoming online user feedbacks for the product.

10. The system of claim 1, wherein to prioritize the identified topic, the memory stores the executable instructions that, when executed by the processor, further cause the processor to automatically forward an incoming online user feedback related to the priority topic to an entity.

11. The system of claim 1, wherein to prioritize the priority topic in resolving the plurality of topics included in the online user feedbacks, the memory stores the executable instructions that, when executed by the processor, further cause the processor to automatically generate a response for an incoming user feedback related to the priority topic.

12. A method for managing online user feedbacks for a product, the method comprising:
receiving, via a communication network, the online user feedbacks for the product from a plurality of users, the online user feedbacks being received through an online feedback management platform managing the online user feedbacks provided by the plurality of users through the communication network;
provide each online user feedback for the product to a machine learning model for performing semantic analysis on the online user feedbacks, performing semantic analysis including at least one of implementing optical character recognition to convert verbatim in the online user feedbacks into machine-encoded text, and identifying based on text in the online user feedbacks a plurality of topics;
receive as an output from the machine learning model the plurality of topics for the product from the online user feedbacks;
for each topic, automatically categorizing each of the received online user feedbacks into one of a plurality of groups based on a rating score provided for the product in each online user feedback and the semantic analysis of each online user feedback for the product;
for each topic, automatically identifying a subset of the online user feedbacks to be moved among the plurality of groups based on an assumption that one or more issues related to the topic are resolved;
determining a net promoter score (NPS) uplift for each topic based on a movement of the subset of online user feedbacks, wherein the NPS uplift measures an improvement in a first NPS for the product if the one or more issues related to the topic are resolved;
identifying, from the plurality of topics included in the user feedbacks for the product, a priority topic based on the NPS uplift for each of the plurality of topics; and
prioritizing the identified topic when resolving an issue related to the plurality of topics included in the online user feedbacks.

13. The method of claim 12, wherein to automatically categorize each of the received online user feedbacks for each topic, the method comprises:
automatically categorizing each of the received online user feedbacks into one of a promoter, passive, and detractor groups; and
further classifying the online user feedbacks categorized into each of the promoter, passive, and detractor groups into one of an on-topic, off-topic, and no-verbatim sub-groups.

14. The method of claim 13, wherein to determine the NPS uplift, the method comprises:
determine the first NPS for each topic based on categorizing the received online user feedbacks into one of the promoter, passive, and detractor groups;
determining a second NPS for each topic based on the movement of the subset of the online user feedbacks; and
determining the NPS uplift for each topic based on the first NPS and the second NPS.

15. The method of claim 14, wherein the subset of online user feedbacks to be moved among the plurality of groups includes a set of online user feedbacks that are categorized into the passive and detractor groups when determining the first NPS and are also recategorized into the promoter group when determining the second NPS.

16. The method of claim 13, wherein to further classify the online user feedbacks, the method comprises:
analyzing an online user feedback to determine whether the online user feedback includes text; and
responsive to determining that the online user feedback fails to include the text, classifying the online user feedback into the no-verbatim sub-group.

17. The method of claim 16, further comprising:
responsive to determining that the online user feedback includes the text, for each topic, analyzing the online user feedback to determine whether the text includes one or more words that are related to the topic;
responsive to determining that the online user feedback includes the one or more words that are related to the topic, classifying the online user feedback into the on-topic subgroup for the topic; and
responsive to determining that words included in the online user feedback are unrelated to the topic, classifying the online user feedback into the off-topic subgroup for the topic.

18. The method of claim 12, wherein to prioritize the identified topic, the method comprises prioritizing a provision of a response to an online user feedback related to the priority topic.

19. The method of claim 12, wherein to prioritize the identified topic, the method comprises automatically modifying a survey used to collect the online user feedbacks to include sub-topics related to the priority topic in collecting incoming online user feedbacks for the product.

\* \* \* \* \*